324-77 CROSS REFERENCE SEARCH ROOM

March 11, 1969 M. V. KALFAIAN 3,432,617

SPEECH SOUND WAVE ANALYSIS

Filed May 3, 1965 Sheet 1 of 4

INVENTOR

Magnus V. Kalfaian

SIMULATED BLOCK DIAGRAM DEPICTING THE LEARNING PROCESS OF THE BRAIN

INVENTOR

Megan V. Kalfaian

BLOCK ARRANGEMENT SIMULATING ANALYTIC FUNCTION OF THE BRAIN

INVENTOR

Megan V. Kalfaian

INVENTOR

Meguer V. Kalfaian

United States Patent Office 3,432,617
Patented Mar. 11, 1969

1 2

3,432,617

SPEECH SOUND WAVE ANALYSIS

Meguer V. Kalfaian, 962 Hyperion Ave.,
Los Angeles, Calif. 90029

Filed May 3, 1965, Ser. No. 452,737
U.S. Cl. 179—1 3 Claims
Int. Cl. H04m *1/00;* G01r *23/16, 27/02*

Figure 1:
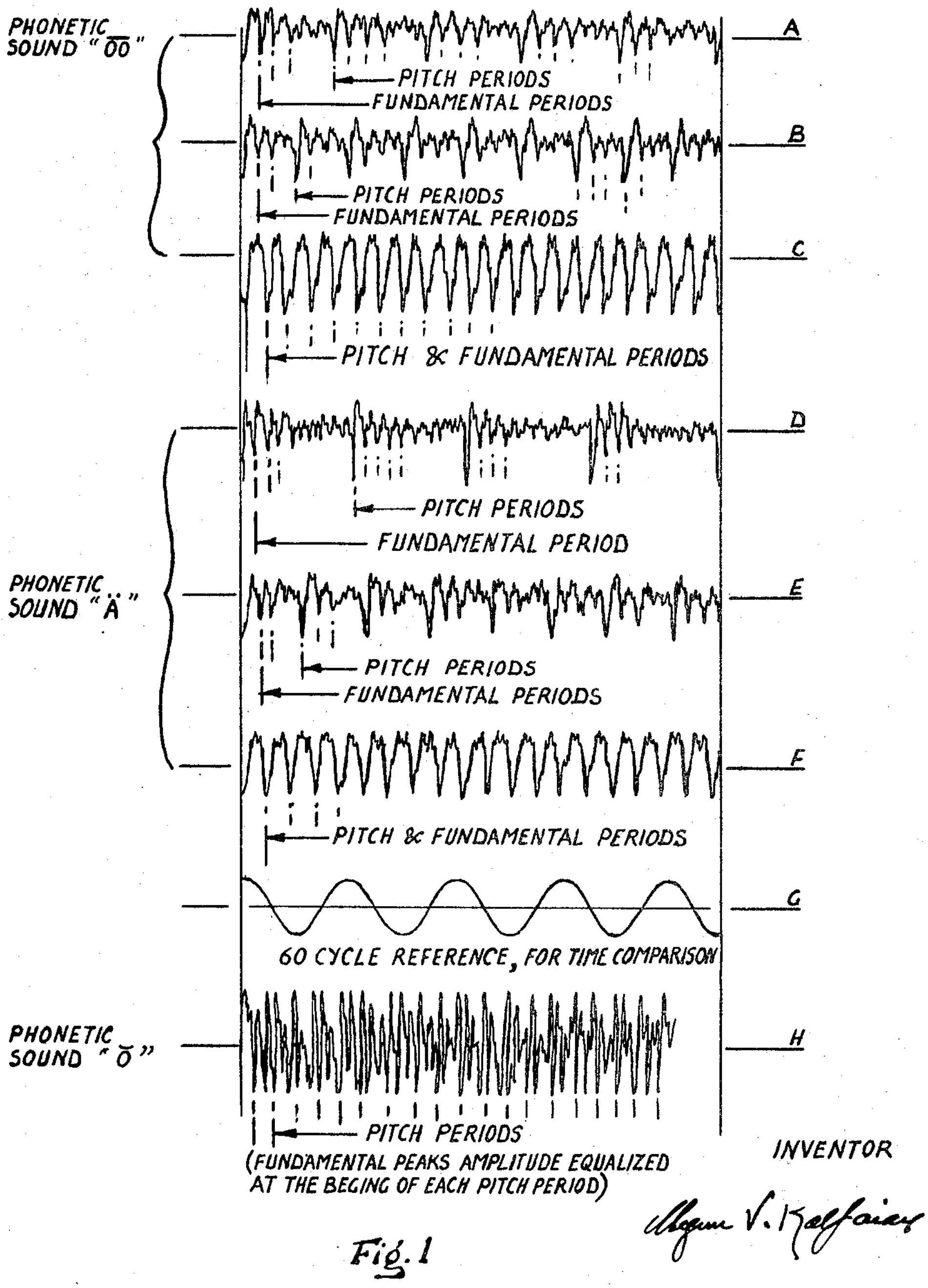

The present invention relates to speech sound wave analysis, and more particularly to the analysis of speech sound waves which are uttered under different environmental conditions by different colored voices. The main object of the present invention is to provide a functional operation by a synthetic machine that will represent a close simulation of the analytic function of the human brain, so that analysis of phonetic sounds as uttered by different speakers may be made as closely accurate as by the human brain. The full realization of an ultimate model, however, depends upon sufficient knowledge on how the brain performs such analysis. Accordingly, the present disclosure is contemplated to be a theoretical advancement of those moot points that still prevail in the knowledge of human communications. The methods and processes presented herein are then based on this theoretical foundation which is claimed to render a practical recognition model heretofore made impossible by previous proposals. Broadly, therefore, the novelty of the present invention will be distinguished from previous proposals by a process of locating the information carrying areas of uttered phonetic sounds in segmented steps and anlyzing these areas step by step, rather than grossly during the entire uttered time period. This process will be more clearly undrstood, however, after describing how the brain interprets phonetic sounds.

Figure 2:
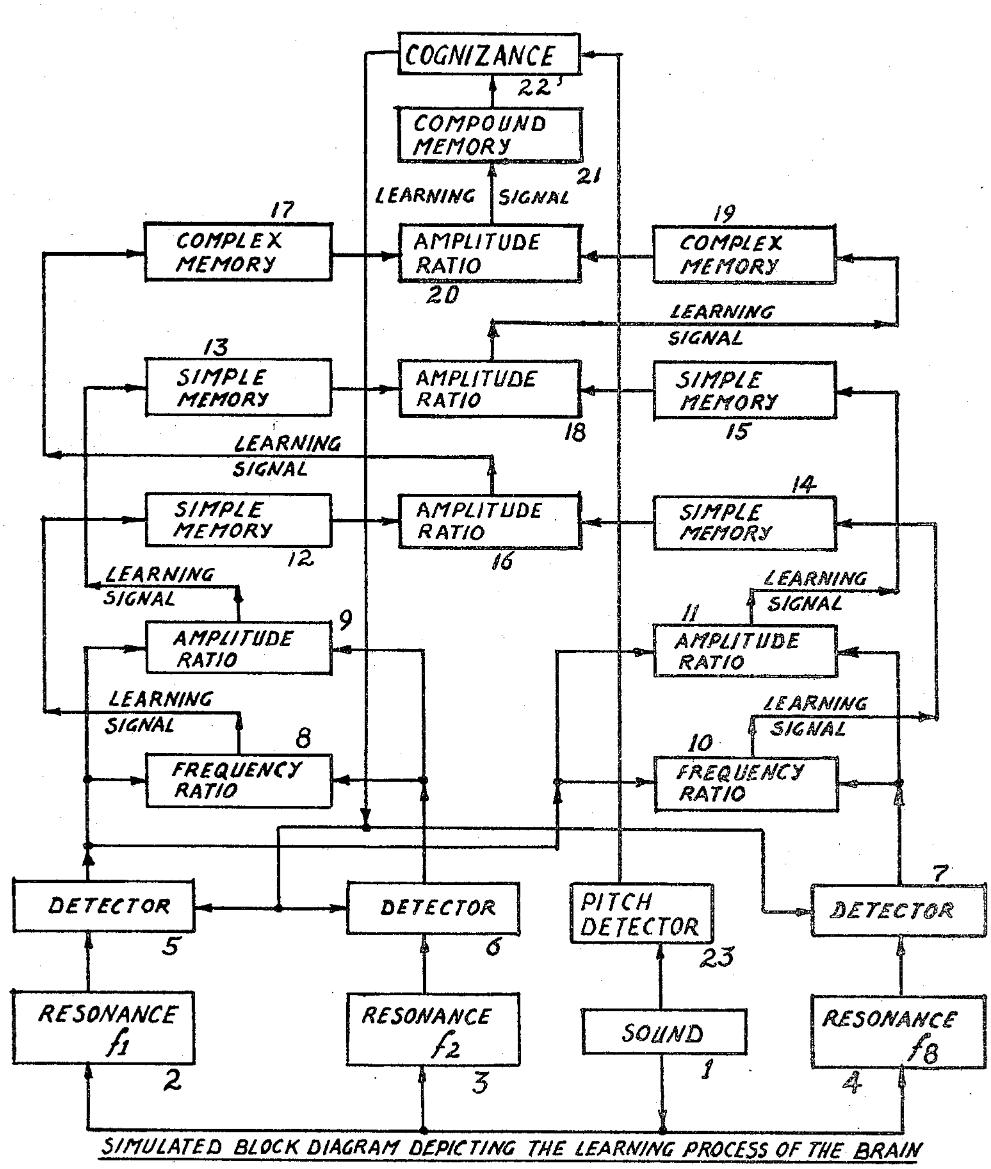
Figure 3:
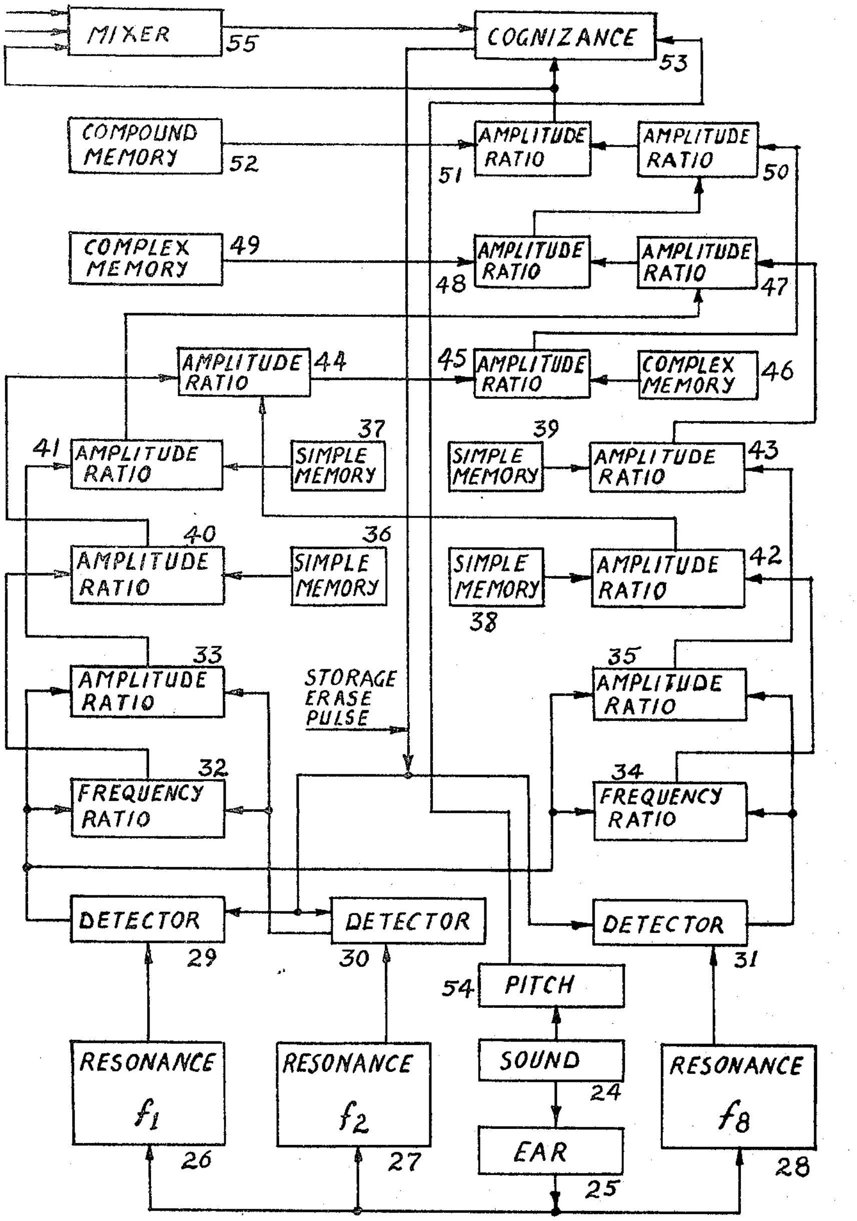
Figure 4:
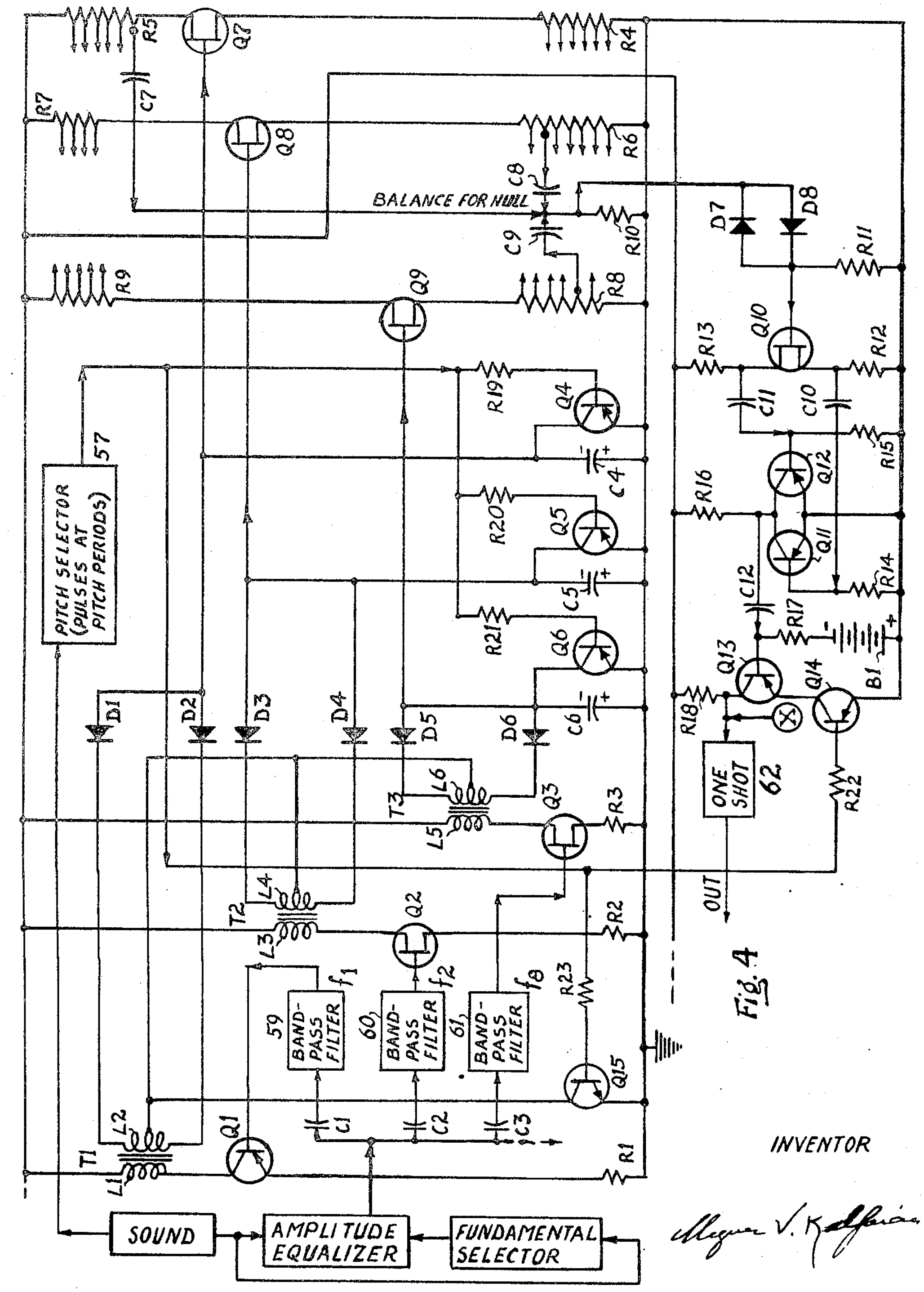

In my previous related patent issus, for example, U.S. Patent Nos. 2,708,688; 2,921,133; 3,067,288; and patent applications Serial Nos. 274,511 filed Apr. 22, 1963; and 280,938 filed May 16, 1963, respectively, I had described how the brain recognizes phonetic sounds. I had also described the function of the brain in my publication, dated Nov. 12, 1964, entitled "Interpretation of Visual Images and Phonetic Sounds, and the Possibility of Extracting These Informations From the Brain," reference copies of which are to be found in the Library of Congress. In this book I had described how the brain learns and interprets both visual images and phonetic sounds. In reference to the phonetic sounds, however, I had used the terms "pitch frequency" and "fundamental frequency" as having the same meaning. These two terms have similarly been used in previous literature on speech terminology, as having the same meaning, for one reason that, the importance of their differences has not yet been understood. For example, in complex waveform terminology, the lowest existing frequency in a complex waveform may either be called a pitch frequency, or a fundamental frequency. In voiced vowel sounds, there appear trains of repeated waveforms, the repetition of which is called the pitch frequency, and the time period of each waveform is called the pitch period. Since this repetition represents the lowest frequency in the sound wave, it is also called the fundamental frequency. In normal speech, however, the repetition of these waveforms or wavepatterns as sometimes referred to, is random, and accordingly, the repetition is also called quasi-periodic. In furtherance, the use of the term "frequency" has so far been ambiguous, because in speech sound waves a wave-pattern may not repeat itself, or, if it does, its adjacent pattern may have a different time period. For this reason, where repetition of wave-patterns exists, and in particular to speech terminology, it has been recently proposed that the term "frequency" be substituted by the term "frequence," for the sake of descriptive clarity. Thus at this point it is evident that the terminology used in previous analytical speech language cannot be construed as having described a physical or electrical phenomena that has not been known to exist, or having knowledge of its behaviour. For example, and specifically referring to speech sound wave terminology, where the term "fundamental" has previously been used to represent the term "pitch" or its equivalent, thereof, it will be understood that only its representation has been presented. For this reason, and whatever terminology that may be, or may have been used, either in the present disclosure, or in any previous literature, only its representation will be defined as comprising the true substance thereof. Accordingly, the expressions used hereinafter will be "pitch period" and ("fundamental frequency" or "fundamental time period"), each expression describing a different phenomena of the spoken sound wave. For example, a pitch period will be represented as a time period during which a complete information comprising both quality and phonetic values are presented. Whereas, a fundamental period will be represented as a time period during which only the phonetic value of the information is presented. The expression "fundamental frequency" will represent as a repetition of said fundamental time periods. Thus the full realization of the present invention, and its novelty thereof, will particularly depend upon the act of locating these distanct informations in a spoken sound wave, as will be described by the reference expressions, and therefore, the use of said expressions should not be referenced to previous literature that may lead to false interpretation of either the theory or the claims made herein. This will be described more clearly with reference to the accompanying drawings, wherein:

FIG. 1 is a graph of actual phonetic sound waves for pointing out where the phonetic informations are located; FIG. 2 is a representative block diagram showing how the brain learns phonetic sounds; FIG. 3 is a representative block diagram showing how the brain interprets phonetic sounds; and FIG. 4 is a schematic arrangement for interpreting phonetic sounds in accordance with the invention.

Constant and variable values of information

Since the present invention relates to simulating the human brain in interpreting intelligent information, We must first divide this information into two distinct categories; the first being a constant value, and the second being a variable or quality value. For example, a thought has a constant value, but an added amplification thereto determines the characteristic quality of the thought. Similarly, all phonetic sounds have constant values, and all associated variables, including environments, have characteristically different quality values. For example, a phonetic sound, as spoken by different speakers, both male and female, has a constant value (the same phonetic sound), but characteristically different in qualities, because of pitch, fundamental, laringeal, and environmental changes. The processes of recognizing these informations, accordingly, whether it be visual, through, or phonetic values, must follow definite patterns, because we know through experience that the final interpretation of these informations by different individuals does not change. For example, when a number of speakers articulate a certain phonetic sound, the listener's brain will interpret each one of the sounds as having the same phonetic value, but each one of them having a distinct quality value distinguishable from the others. We may then refer to the phonetic value as being *constant,* and the quality value as being *variable.* In furtherance, and referring to the constant values, each one of these values are divided into its basic component parts, or the rudiments, as the case may be. For example, a though of constant value may be represented by a spoken sentence using only the basic component parts, such as, "I went skating." The brain needs only to know if the basic component parts are present, such as, an action that has been started, the subject that has started it, and a reason for it. In the given sentence, the brain recognizes the subject as being "I," the action as being "went," and the reason as being "skating." Each one of these parts may then be assigned a coded signal value, so that when all three are present simultaneously, a process of coincidences with pre-stored values will develop into final recognition, which by itself may be represented as a master coded signal. Since each one of these three basic component parts must necessarily be present for conveying the complete thought, even if their sequences are mixed, and whether a series of assertions follow depending on a leading affirmation, or a series of affirmations follow dependent of each other, their distinct signal values will first be translated into a coded master signal as an interpretation of the constant value, and the remaining values as the variants. This is also true for sound wave interpretation, which may be explained as in the following:

Sound interpretation

The process of sound interpretation is exactly similar to the above given basic process, even through the physical behavior of signal conversion inherently differs one from the other. For example, the rudiment of a sound is an eventful phenomena that represents motion. The time period from the inception to termination of this motion represents half the wavelength of a specific frequency. Thus in reference to the physiological aspects of the human brain, the sensory cells (hair cells) on the wall of the cochlea will each respond through a complex of tissues in the organ of Corti (by physical shearing action with that of the basilar membrane) to a motion of particular frequency when fluid pressure at that frequency is induced across the cochlea. The stimulus from any one, or a plurality of these cells are transmitted (in the form of electrical signals) to the temporal lobe of the cerebrum cortex (this will be described further in more detail) through the eighth cranial nerve, as a primary electrical excitation, from which point individual electrical impulses are conveyed to the surrounding matrix of memory cells for comparative coincidence. At the end of said primary excitation, a coincidental comparison is established, and sensation results of having heard and recognized the sound. Thus for continuous sine wave, there is continuous sensation of having heard and recognized the sound, but 180 degrees time lagging with respect to the original, because interpretation starts only after the eventful phenomena has taken place and completed. In the event that this sine wave contained harmonic waves, then the first would be considered as the fundamental wave, and the harmonics being some extraneous component parts that are carried over the fundamental. In this case, the wave would be considered as a complex wave. But the brain still interprets it as a representation of the original sine wave, plus some component waves, the combination of which adds some characteristic effect thereto.

Phonetic sound recognition

As indicated in the foregoing, the human brain is the only existing instrument that can interpret phonetic sounds intelligently. For this reason, let's first refer to the steps in which the intelligible sound signals may be carried from the ear to the auditory area of the cerebrum cortex. The electrical signals translated by the hair cells are transmitted through neurons in the eighth nerve trunk and terminated an area where a secondary electrical image is formed. From this secondary image, signals are conveyed to the permanent memory cells via a maze of intercoupled neurons for relative value matchings. The formation of this secondary image is of basic importance (further to be described), because during imagination this area must also be energized by signals from the permanent memory cells for continual matching actions. This secondary image is formed by elecro-responsive cells, each one of which has a definite relaxation period. Stated otherwise, these cells act as frequency responsive cells covering the entire sound spectrum band. Thus we may assume a screen of a plurality of resonant pass-filters, each becoming active only when energized at its resonant frequency. At this point, two types of resonant elements are mentioned, and the necessity for it is emphasized; the first being electrical conversion of mechanical vibration by the cilia (hairlike sensory cells on the wall of the cochlea); and the second being electro-responsive filter action intermediate between the original and the analytic matrix.

With the above given conditions, assume that a pure phonetic sound is uttered to the ear. The various resonances of the sound are transmitted in various intensities to the electro-responsive cells through the eighth cranial nerve for temporary recording, so that coincidental comparison may be made with the permanent memory cells for matching. Thus assigning numerical values to the electro-responsive cells, for example, number one to the cell resonating at the lowest frequency, the phonetic sound (constant value) is represented by the combined numerical ratios between the lowest number and predetermined two other numbers, and between the intensity values of these selected numbers. Thus, a continuous coincidence is made between the ratios of numerical positions of the lowest number and the higher numbers present, and the intensity ratios between these selected positions. Here again it is seen that the constant value is represented as a three dimensional information such as described in the foregoing by way of spoken sentence. In the case that the uttered voice contained more than a pure phonetic sound, for example, a representation of voice quality, this latter information is then analyzed separately by coincidental matching with permanent memory cells for quality.

With this brief explanation the analytical process of the brain, it is now necessary to know how and where in the uttered voice of the brain locates these constant and variable informations.

Pitch and fundamental time periods

In ordinary speech, both pitch and fundamental frequencies are not always periodic, and therefore, the waves in each succeeding pitch period, and in each fundamental period must be analyzed step by step for recognition. For example, the actual excitation for space vibration of vocal sounds is caused by puffs of air from the glottis entering the mouth cavities. For each phonetic sound, the mouth cavities are shaped differently, so as to produce a set of vibratory waves having definite frequency and intensity ratios with respect to a fundamental. The fundamental in this case, is determined by that portion of the mouth cavity that resonates at the lowest frequency in the said set of frequencies. Whereas the pitch period is determined by the time period between any two puffs of air flowing from the glottis. Thus, it follows that the frequency relation between the fundamental and the pitch is not consistent, because during each pitch period the fundamental may at times repeat itself more than one cycle. This is due to the fact that in voice vowel sounds the mouth formation can be held constant while variably controlling the pitch frequency. This condition may be more clearly illustrated by the actual graphs (these are hand copies from "Honeywell Visicorder graphs," and therefore, high accuracy is not to be expected) of spoken sound waves, as in FIG. 1.

In FIG. 1, the graphs A, B, and C, represent the sound "ŌŌ," and the graphs D, E, and F, represent the sound "Ä." In the production of the first graph A, the speaker had formed his mouth to produce the phonetic sound with a base pitch frequency. Without changing the formation of his mouth, the speaker produced the same phonetic sound with a higher pitch, as shown by the graph at B. And still holding the same mouth formation, he raised the pitch of his voice until the pitch frequency was equal to the fundamental frequency as illustrated by the graph C. This same procedure was repeated in producing the phonetic sound "Ä," as illustrated in the graphs D, E, and F. For time comparison of these graphs, the sine wave at C is given at 60 cycles per sound.

In reference to the graphs A, B, and C, it is seen that the fundamental time period has not changed much (any little change is due to the speaker's inability of holding the shape of his mouth steady during the process of taking the graphs on "Honeywell Visicorder," in fact, these little changes are also apparent during the recording period of each steady sound) in the production of the sound at different pitch frequencies. For example, the graph at A of base voice indicates that there are at least four cycles of the fundamental. Whereas in a higher pitched voice at B, there are about two and one half cycles of the fundamental. Lastly, when the pitch repetition rate has reached its limit, both the fundamental and pitch periods assume the same time periods, because the fundamental period can never be longer than the pitch period, as illustrated in the graph at C. These three illustrations indicate that the phonetic information is contained in one wavelength period of the fundamental (these informations may repeat more than once in each pitch period, as indicated at A and B), and the quality information is contained in a pitch period. (The pitch period is always indicated between two major peaks of the complex wave, as shown.) At this point, emphasis is made to the fundamental time period as being approximately the same in different pitched voices, because the mouth formation had been held subsantially steady while varying the pitch of the voice. This does not mean, however, that a second voice (in this case a female voice) with the same mouth formation for producing the same phonetic sound will have the same fundamental time period. The mouth formation is purely to produce a definite set of resonances in various intensities, that have definite frequency locations with respect to the lowest existing frequency, regardless of what sound spectrum band they are located in. In fact, it may appear that a higher pitched voice will have higher fundamental frequencies than a lower pitched voice. But this is not always the case, and it is not even a rule as to what pitched or quality voice should have higher or lower fundamental frequencies. For phonetic recognition alone, the brain needs only to know if there is a set of basic resonances with definite ratios of frequency separations with respect to each other. The pattern of amplitude differences of these resonances is also important, but not as much, because of clear and obscure voices. I have proven this condition to be true as in the following:

Amplitude equalization

In ordinary speech, the sound level varies tremendously, even for a single voiced phonetic sound in a spoken word. There have been different systems devised for equalizing these amplitude variations, so that high signal-to-noise ratio could be maintained in long distance voice transmission. While presently there are available some practical apparatus for equalizing the voice amplitude without too much quality loss, it had been known one time that such amplitude equalization will inherently destroy the quality of the voice. In my previous patents, and patent applications, for example, Patent No. 3,074,025, having filing date Nov. 10, 1958, I have indicated that the quality of the voice could be preserved with amplitude equalization, when properly done. Thus with my newer apparatus improvement, I have used one hundred percent amplitude equalization without effecting quality loss. This equalization consists of shifting the waves between succeeding major peaks stepwise without introducing any wave distortion or clipping. With such amplitude equalization the object is then to prove that in speech sound waves the quality information is not dependent upon intensity variations.

In a second test, I have equalized the fundamental peaks (substantially equal) of the waves between succeeding major peaks (a pitch period is determined between any two major peaks), as shown by the graph at H, which is a hand copy of the actual Visicorder recording. In this graph, the peaks of the first two fundamental waves are equal to the major peaks, whereas, the major peaks of the original waveform (not shown) were more than twice the peak amplitudes of the succeeding fundamental waves. With such amplitude equalization the phonetic intelligibility is still one hundred percent without the slightest deviation from the original. Whereas, the quality of the voice is changed, but not drastically, and the voice is still pleasant to listen to. This second test, therefore, indicates that the phonetic information is contained in each of the fundamental periods, although the decaying fundamental waves in a long pitch period may not carry as sharp phonetic informations as in the first and second fundamental waves. With these conclusions then, it is evident that the pitch period contains both the phonetic and quality informations. It is not known exactly how the quality information is analyzed by the brain, but most probably it is accomplished by counting the number of fundamentals, and how they decay in amplitude, including some superfluous resonances that occur in a pitch period.

Simulated process of interpretation by the brain

In reference to the foregoing, a sound wave consists of a number of resonances in various amplitudes and in unpredictable time sequences. The selection and analysis of these waves must then require the use of filters; storage systems; erasing systems; relays; gates; coincidental comparison systems; and the like. While in the art of electronics these elements are commonly used and their physical properties and behaviors are understood, the brain also possesses these elements, although very little knowledge exists at present regarding their physical properties and behaviors. But their functional activities can be explained. For example, when a sound wave arrives at the ear and induces corresponding fluid pressure across the cochlea, the sensory cells (hair cells) on the wall of the cochlea will each respond to a motion of particular frequency by physical shearing action along the frequency scale of the tapered basilar membrane, and translate it into electrical signals, in terms of frequency and quantity representations. These signals are transmitted through individual neurons in the eighth nerve trunk to an area where a secondary electrical image is formed by a number (thousands) of frequency responsive cells, which for convenience, will be termed herein as electro-responsive cells, because the proper terminology has not as yet been established due to lack of knowledge of its existence. Each one of these cells has a different relaxation period, and accordingly, these cells act as frequency responsive electrical elements covering the entire sound spectrum. Thus we may assume a screen area comprising a plurality of pass-band filters, each one becoming active only when energized at its resonant frequency. I have emphasized the existance and importance of this electrically responsive area in my published book, as mentioned in the foregoing. In order to prove its importance and existence herein, reference is first made to the fact that when a sound arrives at the ear from an outside source, the brain recognizes the sound arriving from an outside source because simultaneous signals are transmitted from the hair cells to the brain for this recognition. Whereas, when the same sound is only imagined, the sound appears to have the feeling of silent sound, because in this case, the electro-responsive cells are energized by inner control, while the signals from the hair cells are missing. This can be proven by an experiment which was performed accidentally by a boy named Pat Flanagan, and reference may be made to Los Angeles Times, Apr. 5, 1962, Part 1—p. 28. The experiment was as in the following:

A radio frequency wave was modulated by sound waves, and applied to two planar electrodes. After insulating these electrodes properly these electrodes were held space parallel against the temples, which stimulated the brain with the feeling that the sound is being heard, but silently. This strange phenomena was not explained at the time, nor has it ever been explained to date in any literature, but it confirms my theory of the electro-responsive cells. To explain this theory, the two electrode pads caused a high frequency electric field that traversed the area of said electro-responsive cells. The changing electric field between the two plane parallel electrodes stimulated these cells, and because this changing field was modulated in amplitude by the sound waves, the different cells responded to the different frequency components of the sound wave, thus rendering the effect of sound hearing. But since the cognizance signals from the hair cells were absent, the brain interpreted the arriving signals as silent sound. This condition can be easily explained due to the fact that the hair cells are only mechanical responsive, and the neurons that carry the cognizant signals cannot be stimulated in an electric field to carry any type of signals. This can also be explained by the fact that an eletcrically responsive cell (human brain) cannot be stimulated by the radiation of high frequency waves, but they can be stimulated in the high frequency electric field between plane parallel electrodes, which as stated, will respond only when the field is intensity varied at sound frequencies. In furtherance, during imagination of sound these electroresponsive cells are stimulated by inner control, but because the cognizance signals from the hair cells are missing, the sound is then interpreted as silent hearing.

With the explanation of the existence and behavior of the electro-responsive cells, acting as electrical passband filters for the arriving complex sound wave to be interpreted, the remaining essential elements for a complete interpretive system may then be substituted by temporary and permanent memory cells, neurons and synapses, which can perform complexity of functions much more efficiently than by the synthetic parts just mentioned. While I have explained the process of sound interpretation by these elements in my book, as mentioned in the foregoing, a thorough explanation of the structure and behavior of the SYNAPSE is given in an article by Sir John Eccles in Scientific American, January 1965, pp. 55–66, and reference should be made to it. Accordingly, it is not necessary herein to delve into the physiological aspects of these elements (even then it being impossible, due to insufficient knowledge in the present state of the art), and block representation will suffice to describe the process of intelligent interpretation. However, any type of information cannot be interpreted prior to learning, and therefore, it is proper that this latter process be given first, as in the following:

Block representation of learning by the brain

In describing the process of learning, it is first assumed that the brain is mature but completely ignorant of the information to be learned. Thus, we may now convey a phonetic sound comprising three basic resonances (in its purest form) to be learned. These three resonances from the sound block 1 in FIG. 2, are picked up by the resonance blocks 2, 3, and 4, and the outputs of these blocks are detected by the blocks 5 to 7, respectively. The resonance block 2 is tuned to a frequency $f_1$, the block 3 is tuned to harmonic frequency $f_2$, and block 4 is tuned to harmonic frequency $f_8$. These tuned blocks represent the electro-responsive cells, as described above. The detectors in blocks 5 to 7 represent temporary memory cells, or, in the language of electronics, they may represent storage capacitors which may be charged to a steady value and then dissipated by short circuiting it at the proper time. Thus assuming that the input sound wave is produced within a single pitch period (from major peak to major peak), the three resonances are separately passed through blocks 2 to 4, and stored in proportional peak levels in the blocks 5 to 7, respectively, This storage is important, because the three resonances arrive at different time intervals during the pitch period, and for final decision of learning all these stored signals must be present, e.g., if the detectors 5 to 7 were represented by capacitors with parallel resistors connected thereto, some of the stored signals would have lesser values at the end of the pitch period. Up to this point there is established temporary memories of basic component parts at the outputs of blocks 5 to 7. These basic values must now be translated into permanent simple memories; complex memories; and finally to a compound memory, which is accomplished as in the following:

Assuming that resonance $f_1$ represents the fundamental frequency, the stored signals of blocks 6 and 7 are separately measured with respect to the output signal of block 5, both in frequency and amplitude ratios. For example, the outputs of 5 and 6 are measured in block 8 for an indication of frequency ratio, and the outputs of 5 and 6 are measured in block 9 for an indication of amplitude ratio. Similarly, the outputs of blocks 5 and 7 are measured in block 10 for an indication of frequency ratio, and the outputs of 5 and 7 are measured in block 11 for an indication of amplitude ratio. These indicated ratio values now represent simple memories, and must be applied to permanent memory cells that serve as slave memory cells for complex memory cells. Thus according to the block arrangement, the measured output of block 8 is transmitted to the memory cell (representing simple memory), in block 12 for activation, which at this time assumes a permanent knowledge of the signal conveyed. Similarly, the measured output of block 9 is transmitted to the memory cell (representing simple memory) in block 13 for activation, which at this time assumes a permanent knowledge of the signal conveyed. The simple memory in block 12 has now a permanent memory of frequency ratio, and the simple memory in block 13 has a permanent memory of amplitude ratio. This very process is similarly repeated in the simple memory blocks 14 and 15, as shown by the drawing arrangement.

Prior to learning, the memory cells are not active, and do not perform any operation. But once they are activated in maturity with knowledge, or memory, they perform preassigned duties whenever reexcited by either from an incoming signal from outside source, or from within (imagination). Thus in reference to the process of cell activation already reached at this point, and with continued activation from the stored signals from blocks 5 to 7, the simple memories in blocks 12 and 14 produce output signals for coincidental measurement in block 16, the output of which is applied to the memory cell in block 17 for activation, as a permanent knowledge of the simultaneous excitation of the simple memories in blocks 12 and 14. Thus the memory cell in block 17 represents a complex memory of frequency ratios. Similarly, the simple memories in blocks 13 and 15 produce output signals which are coincided in block 18, for activating the complex memory cell in block 19, which in this case, represents a complex memory of amplitude ratios. Finally, and in similar fashion, the outputs of 17 and 19 are coincided in block 20, the output of which is transmitted to the compound memory cell in block 21, which now represents the final recognition element of the compound signals arriving from the sound block 1. At this point, however, knowledge of this recognition is not acquired until a command signal arrives at the cognizant cell in block 22, indicating that the knowledge acquired so far represents the final recognition of the sound. This is accomplished by the major peak detector (pitch) in block 23, which at the end of the pitch period sends a pulse signal to the cognizance cell in block 22 indicating that the incoming information has ended. At this point, the cognizant cell having already received a signal from the compound memory cell in block 21, the simultaneous pulse from block 23 stimulates a sensation that the incoming information has now been learned; if strong activation of these memory cells had been applied. After such learning and cognizance, the cell in block 22 sends an erase signal to the storage cells in blocks 5 to 7, to start anew for learning the following incoming information. With this process of learning, the interpretation of already learned information may now be described by way of the block arrangement of FIG. 3, as in the following:

Simulated block diagram depicting the interpretive function of the brain

Referring to FIG. 3, the sound in block 24 is transmitted to the ear in block 25, from which the various resonances are translated into electrical waves and conveyed to the electro-responsive cells in blocks 26, 27 and 28. As described in the foregoing, each one of these cells (thousands) responds to an electrical wave of definite frequency; thus the cells in blocks 26, 27 and 28 are represented as having frequency responses at $f_1$, $f_2$, and $f_8$, respectively. The outputs of blocks 26, 27 and 28 are detected in detector blocks 29, 30 and 31, respectively, for temporary storage. As described in the foregoing, the resonance at $f_1$ represents the fundamental frequency, and therefore, the output storage signals of blocks 30 and 31 must be matched with the output storage signal of block 29. Thus the frequency ratio between $f_1$ and $f_2$ is measured in block 32, and the amplitude ratio of these two resonances is measured in the block 33. Similarly, the frequency ratio between $f_1$ and $f_8$ is measured in block 34, and the amplitude ratio of these two resonances is measured in the block 35. The outputs of blocks 32 through 35 then represent the simple memories that had been described by way of the block diagram in FIG. 2. Accordingly, the outputs of these blocks are now measured with respect to the outputs of simple memories of blocks 36 through 39, in amplitude measuring blocks 40 through 43, respectively. The sequence of this matching process continues until a single output signal is obtained. Thus, the measured outputs of blocks 40 and 42 are measured in block 44, and the measured output of this block is further measured in block 45 with respect to the signal of complex memory in block 46. Similarly, the measured outputs of blocks 41 and 43 are measured in block 47, and the measured output of this block is further measured in block 48 with respect to the signal of complex memory in block 49. Finally, the measured outputs of blocks 45 and 48 are measured in block 50, and the output of this block is measured in block 51 with respect to the signal of compound memory in block 52. With all these sequences of matching when a final signal is obtained at the output of block 51, it energizes the cognizance cell in block 53 with the feeling of recognizing the incoming sound. However, this recognition is not completed until a signal arrives from the pitch detector in block 54, which causes the feeling of having received and recognized the sound, and at which instant the block 53 sends an erase signal to the detectors 29, 30 and 31, for a new cycle of storage.

At this point reference is made to the pitch of the sound, which as described in the foregoing, represents the time period between two major peaks. Whereas, by reference to the actual waveform H in FIG. 1, it is seen that the major peaks in pitch periods are destroyed, and yet one hundred percent phonetic intelligibility is claimed. This is true, because in this case the pitch selector now selects the fundamental peaks as the major peaks, and each fundamental period contains all the phonetic information necessary. But, as I have also stated, the waveform at H had degraded the quality of the sound. Thus in all intelligent interpretations, whether it be a sentence or a phonetic sound, the cognizance cell in FIG. 3 must be informed that the incoming information has been completed for interpretation; and in sound waves this is accomplished by selection of the major peaks. I have also proven by actual tests that the speech quality can be improved by emphasizing the major peaks. In this experiment, I have used a practically accurate major peak selector in combination with an especially devised circuitry, to emphasize the major peaks of unclear voices without destroying the original sound waveform, with the result of high improvement over the original quality of the voice.

With the above given explanation, and in conjunction with the block diagram representation, it is seen that the brain interprets phonetic sounds only by ratio measurement, and not by location finding. For this reason, the brain doesn't care in what frequency region of the sound spectrum band the phonetic sound is uttered, because it already has a huge number of complex intercouplings to take care of all the variables. For example, if a phonetic sound consisted of the basic resonances $f_1$, $f_2$ and $f_8$, as shown in the block diagram of FIG. 3, these resonances may just as well be $f_2$, $f_4$ and $f_{16}$, and the phonetic interpretation would be the same. For this reason, the cognizance cell in block 53 is energized through a mixer, as shown by the block 55, so that the same interpretive signal that may result from a set of resonances produced in different regions of the sound spectrum will be applied to the cognizance cell in block 53 through the mixer block 55. The block arrangement of FIG. 3, however, is given only as a generalization of the brains interpretive mechanism, and not as a detailed structure, because there isn't enough knowledge available at present to construct a detailed model of the brain. The main purpose herein has been to understand what the brain does for phonetic sound interpretation, and not how does it, so that its ultimate performance may be simulated synthetically for phonetic recognition.

Schematic arrangement

Referring to the arrangement of FIG. 4, the output of sound source in block 56 is applied to the pitch selector in block 57, the amplitude equalizer in block 58 and to the fundamental frequency in block 63. These devices shown in block diagrams may be of conventional design, or they may be of the types disclosed in my related patents, for example, the pitch extractor shown in my Patent No. 2,872,517, Feb. 3, 1959, and the amplitude equalizer as shown in my Patent No. 2,958,047, Oct. 25, 1960. The output of amplitude equalizer block 58 is applied to a plurality of band-pass filters in blocks 59, 60 and 61 through coupling capacitors C1, C2 and C3, respectively. While only three filters are shown in the drawing, their number may extend from eight to thirty-two filters to cover the spectrum band of speech sound frequencies. This particular phase, however, had been established in the previous art, and it is not important to be repeated herein. The output of filter 59 is coupled to the gate electrode of transistor Q1, and the drain electrode of which is connected to the supply voltage in series with the primary coil L1 of transformer T1. Similarly, the output of filter 60 is coupled to the gate of transistor Q2, and the drain of which is connected to the supply voltage in series with the primary coil L3 of transformer T2. Further, the output of filter 61 is coupled to the gate of transistor Q3, and the drain of which is connected to the supply voltage in series with the primary coil L5 of transformer T3. The resistors R1, R2 and R3 in the source circuits of Q1, Q2 and Q6, respectively, are included for functional linearity, but either they may be dispensed with or other known arrangements may be utilized, as found necessary. The transformers T1, T2 and T3 have wide pass bands, and they serve only as convenient outputs of the said filters. Thus the outputs of T1, T2 and T3 are full wave rectified by their respectively arranged diodes D1 through D6, and stored in their associated capacitors C4, C5 and C6. Across these capacitors are connected shunting transistors Q4, Q5 and Q6, respectively, but the base electrodes of these transistors are normally biased in backward direction, so that they normally represent open circuits across said capacitors. The storage capacitors C4, C5 and C6 are directly coupled to the gate electrodes of transistors Q7, Q8 and Q9, respectively, which function both as source followers and phase inverters by the inclusion of equal valued resistors in their source and drain circuits, for example, by the resistors R4, R5 in the source and drain circuits of Q7, respectively; by the resistors R6, R7 in the source and drain circuits of Q8, respectively; and by the resistors R8, R9 in the source and drain circuits of Q9, respectively. The transistors Q7, Q8 and Q9 are chosen to have high input impedances such as by the use of field effect transistors, so that the voltages across capacitors C4, C5 and C6 will not be disturbed during storage. Thus during a sound input from block 58, the various frequency components are passed through the band-pass filters 59, 60 and 61, and stored separately in capacitors C4, C5 and C6, respectively, in proportional quantities. These storages are then applied to the transistors Q7, Q8 and Q9, respectively, which in turn produce proportional positive and negative voltages in their source and drain circuits. It is now necessary to combine these positive and negative voltages in such proportions that the output result will represent a pre-known phonetic sound. This is done as in the following:

As described in the foregoing, each phonetic sound consists of a set of basic frequency components that have definite frequency ratios with respect to their lowest frequency, which in this case, is represented by the fundamental frequency. Furthermore, the phonetic value of this sound also depends upon their amplitude ratios with respect to each other, mainly, with respect to the fundamental component; but this is not to be accepted as a set rule, because these amplitude ratios may be arranged in any desired fashion without departing from the true spirit and scope of the present invention. Accordingly, the first phase, e.g., the arrangement of frequency ratios, has been established by the selection of different pass-band filters 59, 60 and 61. The second phase, e.g., the arrangement of amplitude ratios, will now be established by voltage dividing taps across resistors R5 through R9, as in the following:

In the arrangement of FIG. 4, only three resonances had been shown to represent a phonetic sound, although different number of resonances may be included in each set. Accordingly, the representative voltages derived from these resonances will be combined in such magnitudes and polarities, that the output result will be zero, or at least minimum, for the representation of a particular phonetic sound. Thus assume that two of these signals are produced in negative polarities, such as obtained from across source follower resistors R6, R8, and the third signal produced in positive polarity, such as obtained from the drain circuit resistor R5 of Q7. By pre-known values for different phonetic sounds, the voltage dividing taps across R5, R6 and R8 are pre-fixed, so that when a phonetic sound arrives with this particular amplitude ratio arrangement, the junction point of coupling capacitors C7, C8, and C9 will be zero, or at least minimum, with respect to ground, for example, across the load resistor R10. Any other combination of voltage ratios produced in this particular fixed arrangement will produce across load resistor R10 a large voltage, or at least greater than said minimum voltage. Accordingly, in the final analysis, all those fixed (for different phonetic sounds) arrangements that will produce greater than the minimum required voltage will be prevented from operating the final decisive element for phonetic recognition. Whereas, the one arrangement that produces the minimum required voltage, or less, will be admitted to operate the final decisive element for phonetic recognition. As described in the foregoing, the time period during which this decision for phonetic recognition will be performed is to be either at the end of a pitch period, or at the end of a fundamental period. In the presently disclosed arrangement, however, this decisive period will be preferred occurring at the end of each pitch period, as controlled by the pitch selector in block 57, although it may be easily arranged to produce short pulses at the endings of fundamental periods. The reason for this preference is to allow the filters as much time as possible for building up (or decay) sufficient electrical energy, in the case that their pass-bands are adjusted too narrow for fast build up. (In fact, normally inoperative electronic loading impedances may be applied to the filters in blocks 59, 60 and 61, so that at the end of a pitch period, or after any instant that analysis of the incoming sound wave is completed, these impedances may be activated during a short pulse period, so as to advance the decay of oscillatory energy built up previously, and thereby preventing the oscillatory built up in the filters in each succeeding analytical period without interference from the built up in a preceding period. These electronic impedances may consist of transistors shunting the filters in series with preadjusted resistances, or optoelectronic impedances now available in the electronics field.) Thus, it is irrelavent herein whether the pitch selector in block 57 is adjusted to select pitch periods or fundamental periods. Assuming that pitch period is selected, at the end of each pitch period the selector in block 57 produces a short pulse that is applied in forward direction to the base electrodes of normally inoperative transistors Q4, Q5 and Q6, for operation. Because of the shunting effect, the capacitors C4, C5 and C6 are discharged, causing the voltages across resistors R5, R6 and R8 return to their normal values. Assuming also at this point, that the losses of oppositely polarized voltages across capacitors C7, C8 and C9 were equal, and thereby causing zero voltage at the junction point of these capacitors with respect to ground, the recharge action of these capacitors will still effect zero voltage at said junction point, because of said oppositely equalized values. Whereas, if these capacitors were originally discharged at different levels, the voltage at said junction point will be offset with respect to ground either in positive or negative polarity, depending on which polarity of discharge or charge had been effected. Thus with the application of simultaneous forward pulses to the bases of transistors Q4, Q5 and Q6, for discharging the storages across capacitors C4, C5 and C6, respectively, there will be oppositely polarized balanced pulses impressed upon the load resistor R10, which will indicate that this particular arrangement is elected to operate a final mechanism for phonetic recognition. Whereas, when the voltages across capacitors C4, C5 and C6 were such that during discharge period a signal in either polarity appears across this load resistor R10, this particular arrangement will be prevented from taking part of such action. This is accomplished as in the following:

As indicated above, the output voltage across load resistor R10 may either be in positive or negative polarity, and therefore, it must first be converted to a pre-fixed polarity. It was also indicated in the foregoing that phonetic sounds as uttered by different speakers may have variations in their amplitude ratios, which necessitates the provision of some threshold operating level. This threshold level, however, depends upon the magnitude of minimum operating signals impressed upon the load resistor R10, and therefore, this level is only arbitrary, as determined by the manufacturer of the device. Thus in one simple arrangement, the voltage across load resistor R10 is transferred to a second load resistor R11 in series with diodes D7 and D8. The average silicon diode has an offset conduction level of 0.7 volts, and therefore, by the use of these diodes all voltages below this level across load resistor R10 will represent the said minimum level for final control operation.

The signals arriving at load resistor R11 are applied to the gate of transistor Q10, which acts both as a source follower and phase inverter across resistors R12 and R13. Thus the positive and negative poled signals across R12 and R13 are coupled to the base electrodes of transistors Q11 and Q12 through coupling capacitors C10 and C11, and across load resistors R14 and R15, respectively. With the proper selection of transistors Q11 and Q12, for example, silicon transistors, the normal current flow through them is close to zero value with zero bias upon their base electrodes. Thus these transistors act as half wave rectifiers, with the result that only one of the transistors Q11 or Q12 becomes conductive when one is forward biased and the other is backward biased simultaneously; thereby effecting unidirectional pulses across common collector circuit resistor R16 of these transistors. This unidirectional pulse is then applied to the base electrode of gate transistor Q13 in backward direction to prevent its operation, by way of coupling capacitor C12 and load resistor R17. The base of Q13 is normally forward biased by the battery B1 for conduction, but the series connected gate transistor Q14 is normally backward biased, from block 57, so that the normal current through the series connection is zero. The forward pulse from the pitch selector block 57 is simultaneously applied to the base of Q14 for conduction, but in this case, if a backward pulse arrives upon the base of Q13, then current is prevented passing to the collector circuit resistor R18, and thereby the one-shot circuit in block 62 is prevented from being energized. Whereas, when during the forward pulse from block 57 the gate transistor Q14 becomes conductive, and at the same time the normal forward bias upon the base of Q13 remains undisturbed, current passes through R18 causing operation of the one-shot circuit in block 62. While the one-shot in block 62 is shown only as an exemplary element, its activation is then utilized as a means of controlling a final device for recognizing the incoming phonetic sound. Also at this point, signals from other combinations that may represent the same phonetic sound, for example, due to fundamental time variations, as described in the foregoing, may be mixed at the terminal (X), so that the one-shot in block 62 may respond to all these variations, as a constant representation of a specific phonetic sound.

As described in the foregoing by way of the graph H in FIG. 1, the fundamental peaks in pitch periods can be amplitude equalized without impairing phonetic intelligibility. Accordingly, it may be preferable to first equalize the peaks of these fundamentals, as by the amplitude equalizer in block 58, which receives its control signals at fundamental peaks by the fundamental selector in block 63. This equalizer may be of any type that is capable of equalizing without effecting appreciable distortion of the original wave. The amplitude equalizer, as I have disclosed in my U.S. Patent No. 2,985,047, Oct. 25, 1960 is found to be suitable for this purpose. This equalizer utilizes a pitch selector, which controls the amplitude variations of the sound wave step by step at pitch periods. When this pitch selector is adjusted to select the fundamental peaks of the sound wave, however, the amplitude equalization will then be effected at the fundamental peaks. Accordingly, the amplitude equalization in block 58 may either be effected at pitch periods or at fundamental periods.

It will be noted that the offset voltages of diodes D1 to D6 will cause some errors of storage across capacitors C4 to C6. However, when the signal voltages across secondary coils of transformers T1, T2 and T3 are of large proportions, this error may not be objectionable. To overcome the offset voltage of these diodes, insulated gate field effect transistors may be used as diodes, as they have zero voltage offset characteristics. It will also be noted that during conductive states of Q4, Q5 and Q6, the secondaries of T1 to T3 will be shunted to ground through their center taps. Although these transformers will recover fast from such shunting effect, due to their wide bandwidth characteristics, it may be desirable that this shunting is avoided. This is easily accomplished by the series connected transistor Q15 in common with the center taps of these transformers, which is normally forward biased by the battery B2 in series with a bias voltage in block 57 (not shown) in series with the current-limiting resistor R23. During a pulse period from the pitch selector in block 57, the transistor Q15 is then biased in backward direction by this pulse, so that these transformers are isolated into floating states. Due to some time that is allowed for the capacitors C4, C5 and C6 to be discharged, it may be desired that during discharge period the voltages across the secondaries of transformers T1, T2 and T3 be approximately at zero crossings, so that these capacitors may be discharged before the voltage reaches its peak value for fast re-charge of the capacitors. This is also easily accomplished by phase adjustment after the band pass filters, which is a conventional practice, and therefore, is not shown in the drawing. Continuing with further modifications, normally inoperative oppositely polarized shunting transistors may be included across output resistor R10, so that when a pulse arrives from the pitch selector in block 57, this same pulse may be applied in forward direction to operate these shunting transistors, so as to speed up the recovery of the voltage changes in the coupling capacitors C7, C8 and C9. Lastly the resistors R19 to R23 are shown only as base-current limiting elements for the transistors Q4, Q5, Q6, Q14 and Q15 and they may be dispensed with if so desired. Accordingly, with these few possible modifications just mentioned, it is seen that various substitutions of parts, adaptations and modifications are possible without departing from the spirit and scope thereof.

What I claim is:

1. In an information identifying system wherein a specific information contained in a complex wave to be analyzed is determined by selecting a specific group of waves from the complex wave and comparing the combination of both the frequency and amplitude ratios of the selected waves with respect to each other in the selected group with that of a standard combination of a group of frequency and amplitude ratios representative of said specific information, said system including means for translating the said selected group of waves into a respective group of unidirectional voltage components in proportional quantities, whereby utilizing the last said components in the process of said ratio comparisons, the system for comparing the amplitude ratios of the said translated group of unidirectional voltage components with those of a group of standard combination of ratios comprising a group of voltage polarizing means, and associated impedance means, respectively; means for applying said group of voltage components to said group of voltage polarizing means, respectively; impedance-dividing pre-adjusted taps on said impedance means, the ratio divisions of said pre-adjustments being in a standard arrangement to represent the specific combination of the quantity ratios of the said group of voltage components, as results from the arrival of a specific information in the said complex wave; and coupling means from said pre-adjusted taps to a common output terminal in such cancelling amplitudes and polarities as to effect a signal below a threshold of minimum amplitude at said common output representing the said identifiable information.

2. In an information identifying system wherein a specific information contained in a complex wave to be analyzed is determined by selecting a specific group of waves from the complex wave and comparing the combination of both the frequency and amplitude ratios of the selected waves with respect to each other in the selected group with those of a standard combination of a group of frequency and amplitude ratios representative of said specific information, said system including means for translating the said selected group of waves into a respective group of unidirectional voltage components in proportional quantities, whereby utilizing the last said components in the process of said ratio comparisons, the system for comparing the amplitude ratios of the said translated group of unidirectional voltage components with those of a group of standard combination of ratios comprising means for translating the said translated group of unidirectional voltage components into a respective group of pulsed voltage components in proportional quantities, respectively; means for producing a control pulse simultaneously with said translation into pulsed voltage components; a group of voltage polarizing means, and associated impedance means, respectively; means for applying said group of pulsed voltages to said group of voltage polarizing means, respectively; impedance-dividing pre-adjusted taps on said impedance means, the ratio divisions of said pre-adjustments being in a standard arrangement to represent the specific combination of the quantity ratios of the said group of pulsed voltages, as result from the arrival of a specific information in the said complex wave; coupling means from the said pre-adjusted taps to a common output terminal in such cancelling amplitudes and polarities as to effect a signal pulse below a threshold of minimum amplitude at said common output as representative of the said information, or a pulse signal above said threshold level representing a false signal; means for translating this false signal into a pulse of unidirectional polarity; an ON-and-OFF gate comprising first and second inputs and an output impedance therefor, the first input being normally forward biased for operation, and the second input being normally backward biased for rendering the gate output in an inoperative state; and means for applying said false signal to the first input in backward direction for non-operation, and the said control pulse to the second input in forward direction for operation, simultaneously, whereby with the presence of said false signal said gate remains idle, while when the signal pulse at said common terminal is below said threshold minimum amplitude the gate becomes operative for causing an output signal in said output impedance means, as an identification of the information aforesaid.

3. The system as set forth in claim 2, wherein is included means for discharging the said translated group of unidirectional voltage components after said information identification has been established, whereby repetition of producing said voltage components can be made for continuity of information analysis.

References Cited

UNITED STATES PATENTS

| | | | |
|---|---|---|---|
| 3,325,597 | 6/1967 | Stewart. | |
| 3,322,898 | 5/1967 | Kalfaian. | |
| 3,215,934 | 11/1965 | Sallen. | |
| 2,928,902 | 3/1960 | Vilbig | 179—15.55 |

KATHLEEN H. CLAFFY, *Primary Examiner.*

R. P. TAYLOR, *Assistant Examiner.*

U.S. Cl. X.R.

324—77